(12) United States Patent
Connell

(10) Patent No.: US 8,600,105 B2
(45) Date of Patent: Dec. 3, 2013

(54) COMBINING MULTIPLE CUES IN A VISUAL OBJECT DETECTION SYSTEM

(75) Inventor: Jonathan H. Connell, Cortland Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1263 days.

(21) Appl. No.: 12/196,732

(22) Filed: Aug. 22, 2008

(65) Prior Publication Data

US 2008/0304742 A1 Dec. 11, 2008

Related U.S. Application Data

(63) Continuation of application No. 11/059,862, filed on Feb. 17, 2005.

(51) Int. Cl.
*G06K 9/00* (2006.01)

(52) U.S. Cl.
USPC ........... 382/103; 382/107; 382/164; 382/170; 382/181; 382/206; 382/224; 382/190; 345/581; 345/582; 345/589; 348/135

(58) Field of Classification Search
USPC ......... 382/103, 164, 165, 167, 173, 206, 224; 345/581, 582, 589
See application file for complete search history.

(56) References Cited

U.S. PATENT DOCUMENTS

2002/0090133 A1* 7/2002 Kim et al. .................. 382/164
2002/0164074 A1* 11/2002 Matsugu et al. ............ 382/173

FOREIGN PATENT DOCUMENTS

WO     WO 03071482 A2 *   8/2003   ............... G06T 5/00

OTHER PUBLICATIONS

Khan, S.; Shah, M.; Object based segmentation of video using color, motion and spatial information. Computer Vision and Pattern Recognition, 2001. CVPR 2001. Proceedings of the 2001 IEEE Computer Society Conference on 2001 vol. 2, pp. II-746-II-751.*
Triesch, J; Von Der Malsburg, C; Democratic Integration: Self-Organized Integration of Adaptive Cues. Neural Computation, Sep. 2001, vol. 13 issue 9, pp. 2049-2074.*
Kehler, O.; Denzler, J.; Triesch, J.; Hierarchical sensor data fusion by probabilistic cue integration for robust 3D object tracking. Image Analysis and Interpretation, 2004. 6th IEEE Southwest Symposium on Mar. 28-30, 2004 pp. 216-220.*
"As a whole" Def. 1. Webster's II New Riverside University Dictionary, Riverside Pub Co., c1984, pp. 1-4.*
O. Javed, et al., "A Hierarchical Approach to Robust Background Subtraction using Color and Gradient Information", Computer Vision Lab, School of Elec. Eng. and Computer Science, pp. 1-6.
C. Stauffer et al., "Adaptive background mixture models for real-time tracking", The Artificial Intelligence Lab., Massachusetts Inst. of Technology, Cambridge, MA, 7 pages.

* cited by examiner

*Primary Examiner* — Matthew Bella
*Assistant Examiner* — Julian Brooks
(74) *Attorney, Agent, or Firm* — Tuntunjian & Bitetto, P.C.; Preston J. Young

(57) ABSTRACT

Systems and methods for detecting visual objects by employing multiple cues include statistically combining information from multiple sources into a saliency map, wherein the information may include color, texture and/or motion in an image where an object is to be detected or background determined. The statistically combined information is thresholded to make decisions with respect to foreground/background pixels.

30 Claims, 2 Drawing Sheets

COMBINING MULTIPLE CUES IN A VISUAL OBJECT DETECTION SYSTEM

RELATED APPLICATION INFORMATION

This application is a Continuation application of co-pending U.S. patent application Ser. No. 11/059,862 filed on Feb. 17, 2005, which is incorporated by reference herein in its entirety.

BACKGROUND

1. Technical Field

The present invention relates to video processing and more particularly to a system and method for detecting objects in video.

2. Description of the Related Art

Background subtraction is a method for finding moving objects in a known background. An incoming image is compared pixel-by-pixel with a stored reference image and a difference mask is computed. Most such algorithms work on a very local basis. Neighboring pixels (in space and time) are considered only in a post-processing morphology stage. This can be a problem especially with shadow removal algorithms and may cause certain textured objects to be ignored. That is, it is possible for adjacent pixels to be corrected in opposite directions (e.g. one brightened, one dimmed) such that neither is perceived as different from the background pattern.

One solution to this dilemma is to not employ a pixel-based shadow removal algorithm, but instead detect all regions and use a post-processing method to determine if certain areas are shadows. This can be done by carefully looking for bounding edges around the object. Yet, this can be a time-consuming operation and the rules for when to break a shadow portion off a larger blob are difficult to formulate. Furthermore, in a highly textured environment (e.g. some outdoors scenes, or in a cluttered office) there is likely to be edge information near the boundary of a region no matter how the region was formed.

Another possible post-processing rule would be to search the interior of a region for texture and compare this to the texture found in the original background image. Once again, however, the criteria governing when to retain or dismiss a region are problematic.

SUMMARY

Systems and methods for detecting visual objects by employing multiple cues include statistically combining information from multiple sources into a saliency map, wherein the information may include color, edge differences and/or motion in an image where an object is to be detected. The statistical combination method makes use of pixel noise estimates to weight the contribution of pixel-by-pixel and local neighborhood cues. The statistically combined information is thresholded to make decisions with respect to foreground/background pixels.

A system for detecting visual objects by employing multiple cues includes a video source, which provides images to be processed. A probability determination module determines a probability for a plurality of cues based upon available information to determine if a pixel belongs to an object or a background, wherein the cues include a combination of pixel-by-pixel cues and local neighborhood cues. A statistical combiner combines the probabilities from each of the plurality of cues into a saliency map such that statistically combined information is employed to make decisions with respect to foreground or background pixels.

Another system for detecting visual objects by employing multiple cues includes a video source, which provides images to be processed. A probability determination module determines a probability for a plurality of cues based upon available information to determine if a pixel belongs to an object or a background. A noise estimator estimates noise for each cue, wherein the noise estimate is employed in deriving probabilities for the cues. A statistical combiner combines the probabilities from each of the plurality of cues into a saliency map such that statistically combined information is employed to make decisions with respect to foreground or background pixels.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Illustrative embodiments described herein statistically combine information from multiple sources (cues), e.g., differences, edges, and optionally motion, into a saliency map and then threshold this combined evidence to yield foreground/background pixel decisions. For example, differences may include changes in color, texture, edge energy or outlines, movement, etc. between frames. Because the system and methods may directly employ edge information, a change of texture contributes to a detection. Moreover, the computation and decision criterion are simple (addition and thresholding, respectively).

In a system using both texture differences computed over multi-pixel neighborhoods and more traditional single-pixel differences, a sound statistical basis may be found for combining the two types of differences. A suitable weighting can be achieved by measuring then propagating an estimate of pixel channel noise through the relevant cue detection computations to arrive at a corresponding estimate of noise for each type of cue.

This same methodology can be extended to cover the combination of additional pixel-by-pixel or local neighborhood cues. In particular, it is advantageous to merge motion into the saliency computation. This allows the system and methods to detect objects with smooth intensity gradients that might be missed by the pixel difference or texture methods alone.

The system and methods preferably estimate probabilities for each information source, and these probabilities are preferably based on overall noise estimates. The global noise estimates) is one aspect that differentiates the present invention from other approaches.

In general, the image in question may have more or less than 3 color channels (e.g., black and white security cameras, or military multi-spectral imagery). A noise estimate can be generated for each available channel (and/or additional information source(s) or cue(s)) and propagated appropriately.

It should be understood that the elements shown in the FIGS. may be implemented in various forms of hardware, software or combinations thereof. Preferably, these elements are implemented in software on one or more appropriately programmed general-purpose digital computers or equivalents having a processor and memory and input/output interfaces.

Figure 1:
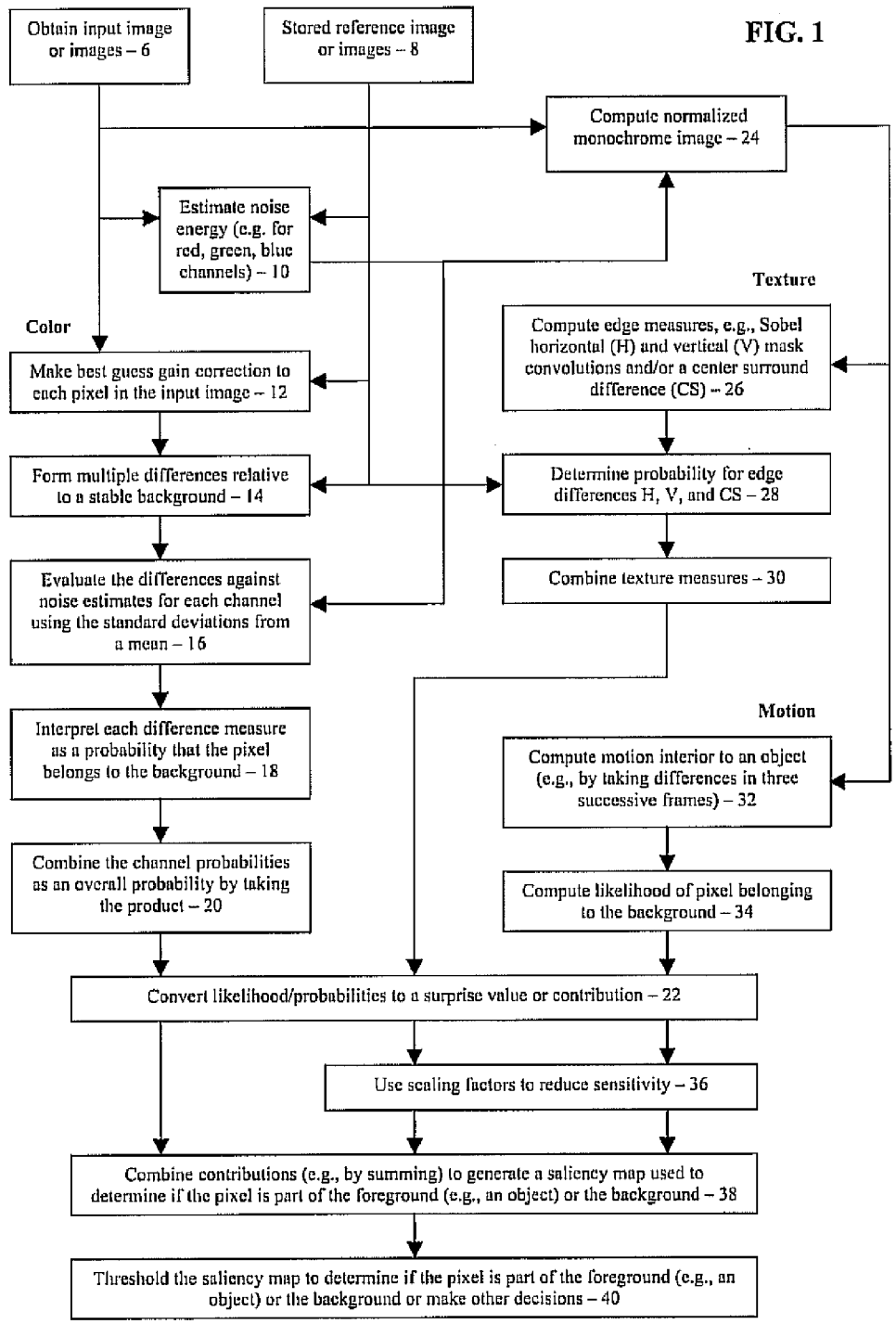
FIG. 1 is a block/flow diagram showing an illustrative system/method for detecting objects in video based upon multiple cues.

Referring now to the drawings in which like numerals represent the same or similar elements and initially to FIG. 1, a block/flow diagram shows an illustrative system/method for object detection in video. The steps represented in the determination of probabilities may be taken in any order. In addition, it is noted that the probabilities calculated for edge differences, color and motion may be replaced or combined with other characteristics or information in an image.

In block 6, an input image or images are taken and provided for processing. Cues may include color/texture, edge differences, motion, etc. Other cues may also be employed in addition to or instead of these cues.

In block 10, the system illustratively starts by estimating the noise energy in each of the red, green and blue color channels for an image as a whole as compared to a stored reference image in block 8.

In block 12, the system starts the color processing chain by making a best guess gain correction to each pixel in the input image (Ic(x,y)→I'c(x,y) where c is a color channel: r=red, g=green, b=blue) to correct for shadows. This correction is constrained to small range of gains corresponding to the depth of shadows (or inter-reflection highlights) expected.

In block 14, multiple (e.g., three) differences are formed relative to the stable background image (Sc(x,y) from block 8). These differences are then evaluated relative to the noise estimates for each channel (Nc) to determine how many standard deviations they are from the mean (assumed at zero) in block 16. In block 18, given a Normal or Gaussian distribution of noise differences and interpreting the noise estimates as the standard deviations of these distributions, each such difference measure can be interpreted as a probability that the pixel belongs to the background (Bc(x,y)).

$$Dc(c,y) = I'c(x,y) - S(x,y)$$

$$Bc(x,y) = J*\exp[-Dc(x,y)^2/(2*Nc^2)]$$

where $J = 1/(2*pi)^{1/2}$

If the pixel color channels are assumed independent, the overall probability (Bp(x, y)) that a pixel belongs to the background model can be modeled as the product of the channel probabilities in block 20. This is easier to work with if the logarithmic probability (Lp(x, y)) is used instead. This formulation is sometimes interpreted in an information theoretic context as the "surprise", (block 22) about the observed value, $$Bp(x, y) = Br(x, y) * Bg(x, y) * Bb(x, y)$$

$$Lp(x, y) = -\log Bp(x, y)$$
$$= -\log Br(x, y) - \log Bg(x, y) - \log Bb(x, y)$$
$$= [(Dr/Nr)^2 + (Dg/Ng)^2 + (Db/Nb)^2]/2 - 3*\log J$$

Here the red channel difference Dr(x, y) is abbreviated as Dr, and similarly for Dg and Db. The corresponding noise in the red channel Nr(x, y) is likewise abbreviated as Nr, as are the two other channel noise estimates Ng and Nb.

Noting that the saliency of a pixel based on color differences should be lowest when Dr=Dg=Db=0, the saliency contribution Ep of a color difference may be defined as follows. Note that a difference of one standard deviation in any channel yields an Ep value of one.

$$Ep(x, y) = 2*Lp(x, y) + 6*\log J$$
$$= Dr^2(x, y)/Nr^2 + Dg^2(x, y)/Ng^2 + Db^2(x, y)/Nb^2$$

The saliency due to color differences is next combined with saliencies due to texture and motion. To make these new contributions comparable to Ep, the differences are computed on a monochrome version (G) of the input image produced in block 24. This image is specially constructed so that one standard deviation difference in any of the color channels will yield the same change in the combined intensity. Here k is a simple scaling factor determining how many intensity levels in the output correspond to one standard deviation in a color channel.

$$G(x,y) = k*(I'r(x,y)/Nr + I'g(x,y)/Ng + I'b(x,y)/Nb)$$

For texture, a variety of edge energy measures are computed: e.g., a Sobel horizontal mask convolution, H, a Sobel vertical mask convolution, V, and a 3×3 (or other neighborhood size) center surround difference, C in block 26. The same measures may also be extracted at each pixel over a similarly normalized monochrome version of the background image (from block 8).

Differences in each of these texture "channels" is then noted in block 28. Separating the two Sobel masks means changes in the orientation of a texture can be detected even if the magnitude of the texture remains comparable. Including the center surround operator more clearly marks the presence of features such as corners and speckles, which generate only weak Sobel responses.

In block 30 the multiple edge measures are statistically combined, preferably using noise estimates similar to those described in block 16. For the Sobel mask differences H and V, the expected variation will be k*sqrt(3/4) assuming uncorrelated neighbors, whereas the variation observed for the corner detector C is dominated by the noise of the central pixel and is k*sqrt(9/8). These values can be used as before to generate normalized probabilities, surprise estimates (block 22), and ultimately the contribution Ej of edge differences to the overall saliency. As always, a variation of one standard deviation in any of the texture measures yields an Ej value of one.

$$Ej = (4/(3*k^2))*[Vi - Vs]^2 + (4/(3*k^2))*[Hi - Hs]^2 + (8/(9*k^2))*[Ci - Cs]^2$$

The same statistical noise-based weighting scheme can also be used to incorporate motion into the saliency image. In block 32, for motion, double differences are taken to confine the motion energy to the interior of an object (as opposed to including a trailing "hole" where it has just been). Let G0, G1, and G2 be the monochrome version of three successive frames, the raw motion M1 at the middle frame is defined as:

$$M(x,y) = M1 = \min(|G2 - G1|, |G1 - G0|)$$

Assuming the noise estimates remain the same across time, the k scaling factor for each monochrome frame is also the same. Thus, in block 34, the likelihood Bm(x, y) is assessed such that the observed temporal difference was generated by a pixel that really did belong to the background.

Once again, logarithms are used to convert this likelihood to a surprise value, then offset and scale the surprise value (block 22) to get a saliency contribution Em. Note that, once again, a motion difference of one standard deviation yields an Em value of one.

$$Bm(x, y) = J * expt[-M(x, y)^2 / (2*k^2)]$$
$$Lm(x, y) = -\log Bm(x, y) = (M/k)^2/2 - \log J$$
$$Em(x, y) = 2*Lm(x, y) + 2*\log J$$
$$= (M/k)^2$$

In practice, it may be desirable to multiply the Ej and Em contributions by fractional fudge factors Fj and Fm (default value of one) relative to Ep in order to reduce the system sensitivity to various classes of phenomena in block 36. This yields altered contributions of Ej'=Fj*Ej and Em'=Fm*Em.

After this, in block 38, all three contributions are summed to generate an overall saliency E(x, y) at a pixel. Em, Ep, and Ej are added since this is multiplying the probabilities that the observed pixel changes could occur (due to noise) despite the pixel truly being part of the background.

$$E=Ep+Ej'+Em'$$

In block 40, the saliency value is then thresholded at some particular level of "surprise" to determine if a pixel is part of the foreground (e.g., not plausibly part of the background). This threshold may be user-defined or predetermined. This information may be used to make a plurality of different decisions regarding the status of pixels in an image.

Figure 2:
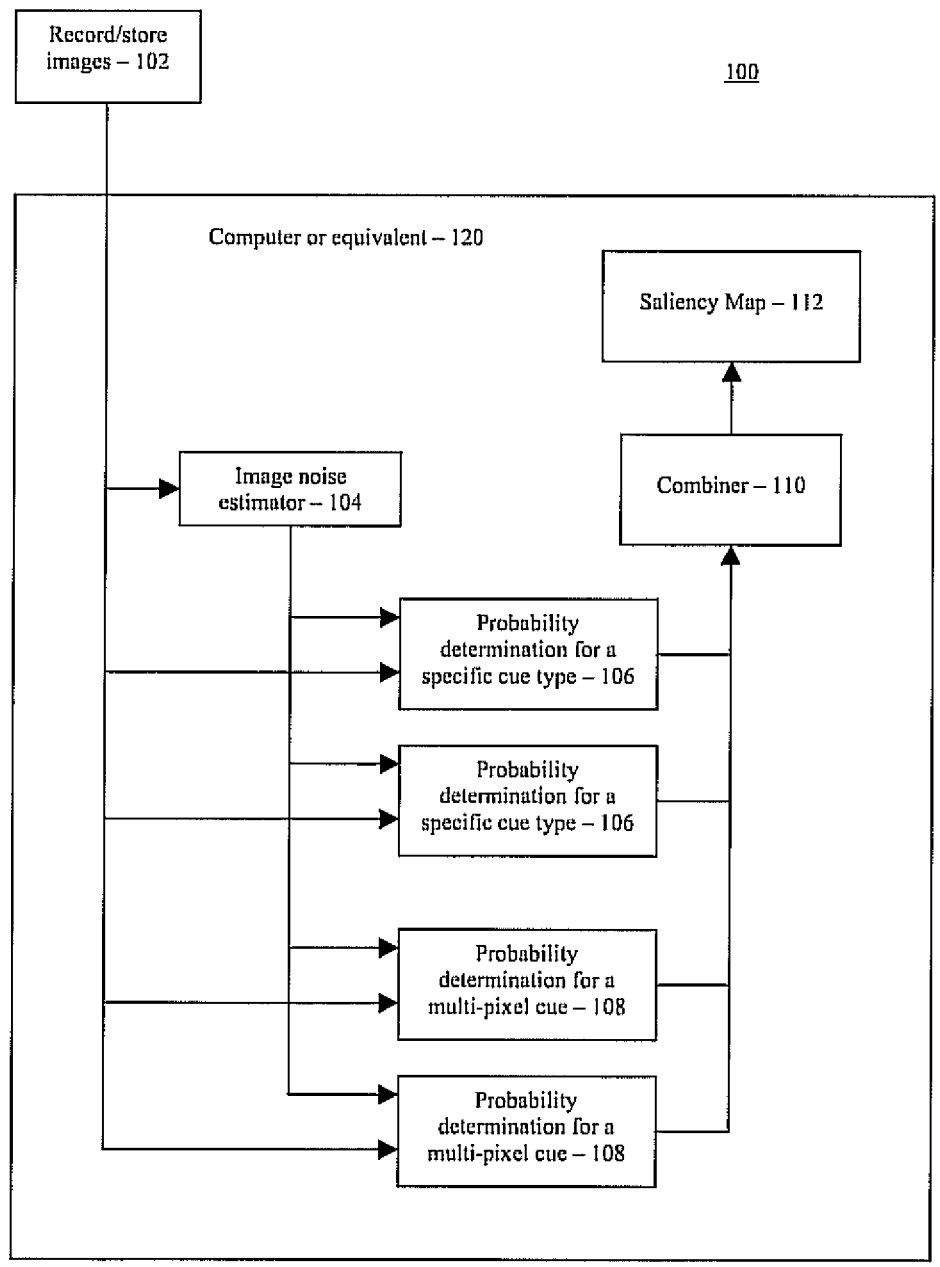
FIG. 2 is a block diagram showing an illustrative system for detecting objects in video based upon multiple cues.

Referring to FIG. 2, a system 100 for detecting visual objects by employing multiple cues is illustratively shown in accordance with one embodiment. System 100 may include an acquisition device 102 for recording and storing video (e.g., a memory or repository) or visual information (e.g., a camera for real-time images). Device 102 may include a video recording device, such as a video camera, digital camera, telephone with a camera built in or any other device capable of receiving, recording and optionally storing image data. These images may be processed in real-time or stored and processed later.

A probability determination module 106 or a plurality thereof determines a probability for a plurality of cues based upon available information solely at a pixel location to determine if that pixel belongs to an object or a background. The cues may include brightness, color, motion, or any other relevant characteristic, which can be used to provide a difference from which a determination can be made about a pixel's status as an object. This is a pixel-by-pixel approach probability determination.

In addition a probability determination module 108 or a plurality thereof determines a probability for a plurality of cues based upon available information in the spatial (or temporal) neighborhood of a pixel (multi-pixel approach) to determine if that pixel belongs to an object or a background. The cues may include texture, edge energy, optical flow, or any other relevant characteristic, which can be used to provide a difference from which a determination can be made about a pixel's status as an object. Probabilities are preferably based on noise estimates on each channel (from each cue or source).

Modules 106 and 108 are advantageously combined in system 100 to provide multiple cues to determine the pixel or group of pixels' status as foreground or background. The pixel-by-pixel approach (106) and the local neighborhood or multi-pixel approach (108) may each employ a plurality of different characteristics (hence a plurality of modules 106 and/or 108), such as color, texture, motion, etc. or combinations thereof in both approach and characteristic. The pixel-by-pixel approach considers characteristics of each pixel while the multi-pixel approach considers a neighborhood or group of pixels' characteristics.

A statistical combiner 110 combines the probabilities from each of the plurality of cues into a saliency map 112 such that statistically combined information is employed to make decisions with respect to foreground/background pixels. A noise estimator module 104 provides a measure of pixel noise in one or several pixels channels to aid in determining the true probabilities in cue detection modules 106 and 108, thereby adjusting the weighting of the cues input to module 110.

Combiner 110, cue modules 106 and 108, and noise estimator 104 may be part of a same computer or system 120, and may be implemented in software. The cues may be related to color, edge differences and motion in an image where an object is to be detected. The noise estimator 104 provides the estimates and functionality as described in FIG. 1 (see e.g., blocks 10, and 16). The estimation of noise can be performed to provide the statistical probabilities for color, texture, motion or any other cue.

Statistically combining information from multiple sources such as differences, edges, and optionally motion, into a saliency map and then thresholding this combined evidence yields significant improvements in foreground/background pixel decisions. Because the system and methods employ edge information directly, a change of texture helps to contribute toward detection of the differences, edges, etc. Moreover, the computation and decision criterion require only simple operations, such as addition and thresholding.

By also merging motion into the saliency calculation, the system and methods can detect objects including objects with smooth intensity gradients that could be missed by the pixel difference or texture methods of the prior art.

Having described preferred embodiments of systems and methods for combining multiple cues in a visual object detection system (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for detecting visual objects by employing multiple cues, comprising the steps of:
   acquiring image data with an acquisition device;
   statistically combining pixel information into a saliency map by weighting multiple cues of a pixel's status using global noise estimates as a basis for determining a statistical probability that a pixel is a foreground pixel or background pixel; and
   thresholding the statistically combined pixel information to make decisions with respect to the foreground/background pixels.

2. The method as recited in claim 1, wherein the statistically combining includes determining statistical probabilities based on color to determine if a pixel belongs to a background image.

3. The method as recited in claim 2, further comprising estimating a gain correction for each pixel in an input image to correct for shadows.

4. The method as recited in claim 3, further comprising forming multiple differences relative to a stable background image to evaluate, relative to the noise energy, estimates for each channel to determine a standard deviation from a mean value.

5. The method as recited in claim 1, wherein the statistically combining includes determining probabilities based on motion to determine if a pixel belongs to a background image.

6. The method as recited in claim 5, further comprising confining motion energy to an interior of an object by taking differences between image frames in a monochrome version of the image.

7. The method as recited in claim 1, wherein the statistically combining includes determining probabilities based on texture to determine if a pixel belongs to a background image.

8. The method as recited in claim 7, further comprising computing multiple difference measures for edges by using a normalized monochrome image.

9. The method as recited in claim 8, wherein the difference measures include at least one of a Sobel horizontal mask convolution, H, a Sobel vertical mask convolution, V, and a center surround difference for neighboring pixels.

10. The method as recited in claim 1, wherein the statistically combining includes combining probabilities for color differences, texture differences and motion for each pixel in an image, and based upon the combined probability, determining if the pixel is background.

11. The method as recited in claim 1, wherein the statistically combining information includes the adjusting the statistical probabilities to permit combining the probabilities.

12. A program storage medium readable by machine, tangibly embodying a program of instructions executable by the machine to perform method steps for detecting visual objects by employing multiple cues, as recited in claim 1.

13. A method for detecting visual objects by employing multiple cues, comprising the steps of:
acquiring image data with an acquisition device;
for each pixel, determining a probability for each of a plurality of information sources for making a determination as to a status of the pixel using global noise estimates as a basis for determining the probability that a pixel is a foreground pixel or background pixel;
statistically combining the probabilities from all of the information sources to form a saliency map to determine whether a pixel belongs to a background image or an object; and
thresholding the statistically combined information to make decisions with respect to foreground/background pixels.

14. The method as recited in claim 13, wherein an information source includes pixel color and the determining probability is based on color to determine if a pixel belongs to a background image.

15. The method as recited in claim 14, further comprising estimating a gain correction for each pixel in an input image to correct for shadows.

16. The method as recited in claim 15, further comprising forming multiple differences relative to a stable background image to evaluate, relative to noise energy, estimates for each channel.

17. The method as recited in claim 13, wherein the determining probability is based on motion to determine if a pixel belongs to a background image.

18. The method as recited in claim 17, further comprising the step of confining motion energy to an interior of an object by taking differences between image frames in a monochrome version of the image.

19. The method as recited in claim 13, wherein the determining a probability is based on texture to determine if a pixel belongs to a background image.

20. The method as recited in claim 19, further comprising computing multiple difference measures for edges by using a normalized monochrome image.

21. The method as recited in claim 20, wherein the difference measures include at least one of a Sobel horizontal mask convolution, H, a Sobel vertical mask convolution, V, and a center surround difference for neighboring pixels.

22. The method as recited in claim 13, wherein the statistically combining includes combining probabilities for color differences, texture differences and motion for each pixel in an image, and based upon the combined probability determining if the pixel is background.

23. The method as recited in claim 13, wherein the statistically combining includes the step of adjusting the probabilities to permit combining the probabilities.

24. A program storage medium readable by machine, tangibly embodying a program of instructions executable by the machine to perform method steps for detecting visual objects by employing multiple cues, as recited in claim 13.

25. A system for detecting visual objects by employing multiple cues, comprising:
a video source which provides images to be processed;
a probability determination module which determines a probability for a plurality of cues based upon available information to determine if a pixel belongs to an object or a background, wherein the cues include a combination of pixel-by-pixel cues and local neighborhood cues; and
a statistical combiner which uses a processor to combine the probabilities from each of the plurality of cues into a saliency map using global noise estimates such that statistically combined information is employed to make decisions with respect to foreground or background pixels.

26. The system as recited in claim 25 wherein the cues are related to at least one of color, texture and motion in an image where an object is to be detected.

27. The system as recited in claim 25 wherein the probability determination module and the statistical combiner are included in a computer system.

28. The system as recited in claim 25 further comprising a noise estimator, which estimates noise, which is employed in deriving probabilities for the cues.

29. A system for detecting visual objects by employing multiple cues, comprising:
a video source which provides images to be processed;
a probability determination module which determines a probability for a plurality of cues based upon available information to determine if a pixel belongs to an object or a background;
a noise estimator, which estimates global noise for each cue, wherein the noise estimate is employed in deriving probabilities for the cues; and
a statistical combiner which combines the probabilities from each of the plurality of cues into a saliency map such that statistically combined information is employed to make decisions with respect to foreground or background pixels.

30. The system as recited in claim 29, wherein the cues include a combination of pixel-by-pixel cues and local neighborhood cues.

* * * * *